Feb. 11, 1941.  P. R. FECHHEIMER ET AL  2,231,408
DEVICE FOR SEALING COLLAPSIBLE TUBES
Filed Aug. 19, 1938  2 Sheets-Sheet 1
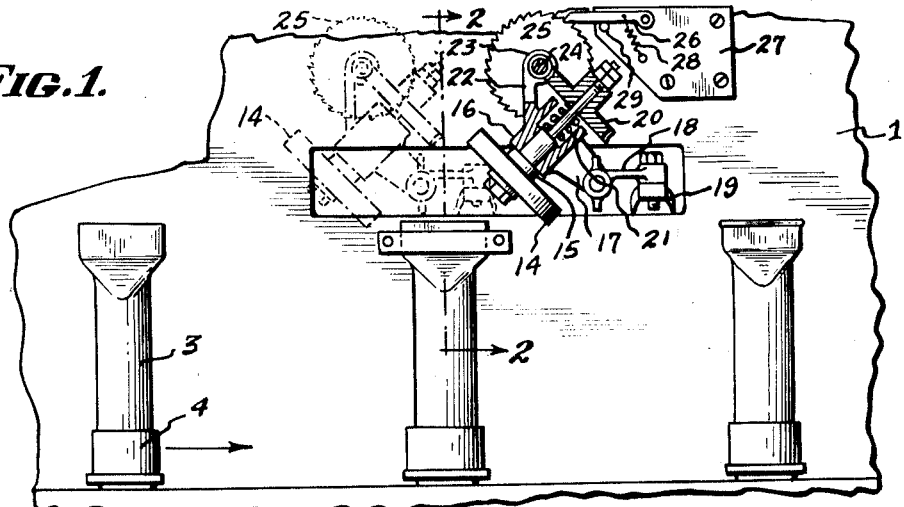
FIG. 1.
FIG. 2.
FIG. 3.
FIG. 4.
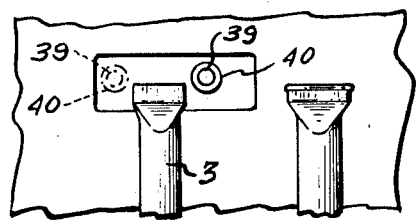
INVENTORS.
PAUL R. FECHHEIMER
AND MERVIL HALLEAD.
BY Allen & Allen
ATTORNEYS.

Feb. 11, 1941.  P. R. FECHHEIMER ET AL  2,231,408
DEVICE FOR SEALING COLLAPSIBLE TUBES
Filed Aug. 19, 1938   2 Sheets-Sheet 2
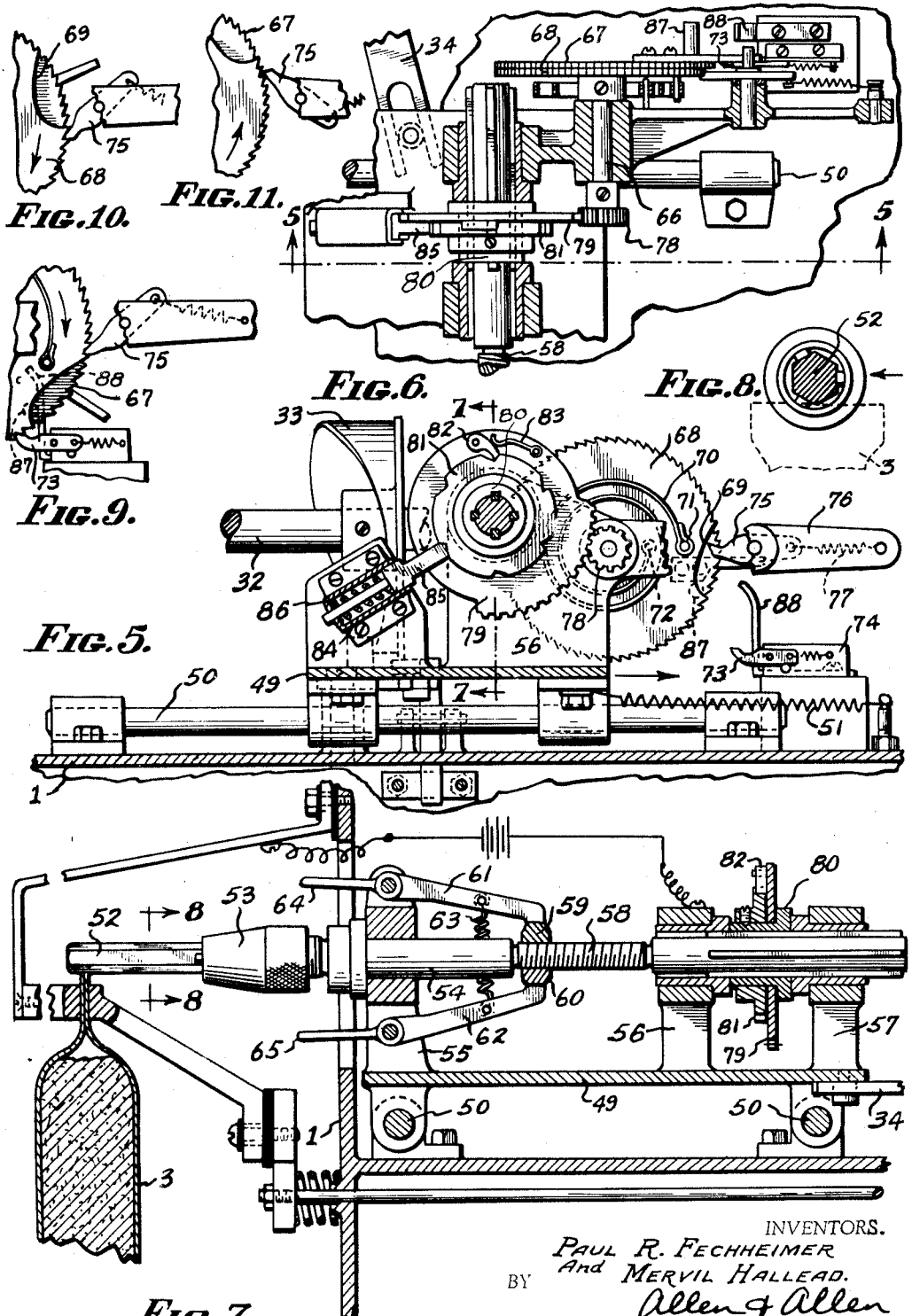
INVENTORS.
PAUL R. FECHHEIMER
And MERVIL HALLEAD.
BY Allen & Allen
ATTORNEYS.

Patented Feb. 11, 1941

2,231,408

UNITED STATES PATENT OFFICE 2,231,408

DEVICE FOR SEALING COLLAPSIBLE TUBES

Paul R. Fechheimer and Mervil Hallead, Cincinnati, Ohio, assignors to The Karl Kiefer Machine Company, Cincinnati, Ohio, a corporation of Ohio Application August 19, 1938, Serial No. 225,824

16 Claims. (Cl. 219—4)

Our invention relates to the sealing of collapsible tubes by the fusion of the tube walls; and in particular to a mode of operation in which the juxtaposed end walls of the tubes are contacted by a welding member. Thus, in one practice electrical contact is made to the tube walls from a suitable source of relatively low voltage and contact is also made to a suitable sealing electrode. When this electrode is brought into contact with the end of the tube heat is developed at the end for the production of a weld. The ends of the tube walls are melted and fused together and after the welding operation, the tube will be found to be sealed with a bead at its end.

In another practice the welding member may be heated by the passage of electrical current through it, e. g. from one end to another.

In still another practice the welding member may be hollow within, and provided with an electrical heating coil placed within the hollow. In still other practices the welding member may be heated by conduction from a member in contact with it, in which heat is developed in any way desired. The manner in which the welding heat is developed is not limiting upon my invention excepting where specifically set forth in the appended claims.

For the details of a suitable machine for the handling of collapsible tubes through the cleaning, filling, collapsing, shearing, welding, and if desired, folding steps, reference may be made to our copending application, Serial No. 174,079, filed November 11, 1937, and entitled Tube filling and sealing means, and also to the copending application in the name of Mervil Hallead, Serial No. 209,765, filed May 24, 1938, and entitled Means for preparing collapsible tubes for sealing. The general procedure followed in welding is that set forth and claimed in Patent No. 2,102,840, issued December 21, 1937, in the name of Paul R. Fechheimer, one of the present inventors. Our present invention finds utility in connection with the methods and machines set forth in those cases; but its utility is not necessarily confined thereto.

In the sealing of collapsible tubes after filling, the end of the tube is flattened or fishtailed, as will readily be understood. Preferably then, the flattened end is sheared. This not only brings each successive tube to a constant height, but also presents a fresh metal surface for welding; which surface is free of oxide. This appears to promote, to an important degree, the perfection of the welds produced. This invention has to do with means for the presentation of fresh surfaces of a welding member to the work being welded, since, whatever the means of developing heat, it has been found that deposits are picked up by the welding member, and that the welding member is likely to become pitted or corroded, and that this interferes with the efficiency of welding and may result in imperfect welds. In sealing collapsible tubes by heat developed electrically at the juncture of the tube walls and a welding member (which will serve as an exemplary embodiment), a carbon electrode has been found most advantageous and will serve as an exemplary welding member for the purposes of this description, though we are not confined to any particular electrode material. Even with sheared tube ends, however, there is likely to be an accumulation of deposit upon the electrode which may interfere with subsequent welding after a fairly long continued period of use. Also there is a tendency for the electrode to become burned or eroded. In commercial operation, it consumes time to change electrodes, and a primary object of the present invention is to provide means whereby a single welding member may be caused to present fresh surfaces continuously or periodically to the tube ends so that it may have a very greatly prolonged period of useful activity. The term electrode is used herein for convenience. We have already pointed out that we are not confined to the development of heat electrically across the contact between the work as one terminal, and a current carrying member as the other terminal of an electrical circuit. Other objects have to do with the provision of types of apparatus for the purpose described as well as a method of welding utilizing the aforementioned means.

These and other objects of our invention which will be set forth hereinafter, or will be apparent to one skilled in the art upon reading these specifications, we accomplish by that certain construction and arrangement of parts of which we shall now set forth several exemplary embodiments.

Reference is now made to the drawings wherein:

Figure 1 is a partial elevational view with certain portions in section of an apparatus suitable for our purpose.

Figure 2 is a sectional view taken vertically along the lines 2—2 of Figure 1.

Figure 3 is a plan view (with a portion of the casing removed) of a different type of mechanism for accomplishing our purposes.

Figure 4 is an elevational view from the front of the casing of the mechanism of Figure 3.

Figure 5 is an elevational view with parts in section of a mechanism for giving a different type of movement to the electrode. It is a view taken along the lines 5—5 of Figure 6.

Figure 6 is a sectional view of this mechanism taken from above.

Figure 7 is a vertical sectional view taken along the lines 7—7 of Figure 5.

Figure 8 is a view showing the electrode in section and the chuck in elevation, and is taken along the lines 8—8 of Figure 7.

Figures 9, 10, and 11 are, respectively, views of ratchet mechanism to be found in Figure 5, showing this mechanism in different positions.

Briefly, in the practice of our invention, we provide in connection with mounting means, for a suitable means for moving the electrode or tool slightly, either continuously or after each sealing operation, or after a predetermined number of sealing operations, so as to present fresh surfaces of the electrode to the work being welded. In Figures 1 and 2, we have indicated one mechanism for this purpose. The frame of the machine is indicated at 1; and the machine itself may be the machine of the copending application first mentioned hereinabove. A plurality of collapsible tubes 3 are shown as held in certain holders 4 moving along a conveyor (not shown) in a step-by-step manner. The tubes may be thought of as having been filled, the ends fishtailed or collapsed and sheared. The portion of the machine illustrated in Figure 1 is the welding device.

At the welding head the tube ends may be clamped. We have shown in Figure 2 a housing 6 which may be bolted to the main frame 1. This housing bears one of the clamping means 9. If electrical contact is to be made to the tube through this clamping means the housing 6 may be insulated from the remainder of the machine and electrical connection made to it as at 10. The corresponding clamping member 11 may be fastened to an operating rod 12 by insulating means 13. The operation of the rod 12 will be in timed sequence to the movement of the tubes on the conveyor. This is accomplished by a mechanism which forms no part of the present invention. While in the several embodiments herein described we have disclosed clamping means, it will be understood that clamping is not always necessary and therefore is not a limitation upon this invention except where specifically claimed. If tube walls are properly juxtaposed it is readily possible to weld them progressively without clamping, providing the welding is carried on at such a rate as to keep molten metal ahead of the welding means, which may be of any of the types set forth above. If electrical connection to the tube is required it can be otherwise made, e. g., through the tube holder.

The electrode is indicated at 14 and in this embodiment is a carbon disc held aslant and adapted at an edge to come into contact with the juxtaposed tube walls and move along these walls during the sealing operation. The carbon disc is shown as mounted upon a shaft 15, which has a bearing in a member 16. An arm 17 serves to mount the member 16 on a second arm 18 which is fastened to a member 19. The member 19 by appropriate mechanism is made bodily movable in a direction parallel to the travel of the conveyor and is moved in such direction as to cause the electrode to traverse the work while the tube 3 is stationary.

The shaft 15 bears a worm wheel 20; and a compression spring 21 engages between this worm wheel and a shoulder in the member 16 as shown, so as to keep the shaft in position. An arm 22 which is bifurcated as shown, is attached to or formed integral with the member 16. This arm carries a shaft 23 which in turn carries both a worm 24 meshing with the worm wheel 20, and a ratchet wheel 25.

During the welding operation, as viewed in Figure 1, the electrode 14 is moved from the position shown in solid lines, to the position shown in dotted lines, and is doing so, traverses the work. On its return stroke a pawl 26 pivoted upon the frame of the machine or upon a plate 27 attached thereto, engages the ratchet wheel 25 and gives it a slight rotary motion in the counterclockwise direction, as will readily be understood from Figure 1. A spring 28 controls the pawl which also has a stop 29. It will be understood that the slight rotary motion imparted to the ratchet wheel 25 on each stroke is diminished by the worm 24 and worm wheel 20, so as to impart a rotary motion to the electrode 14 which is very much less. However, after each stroke the electrode 14 is rotated very slightly but sufficient to prevent any accumulation of dross or oxide on the electrode from interfering with the subsequent weld. Also when the actual surface portion becomes eroded or pitted, the movement of the electrode presents a fresh welding surface, as will be understood. By the apparatus set forth the useful life of the electrode 14 is very greatly lengthened as will be clear; and the necessity for relatively frequent electrode replacement is avoided.

However, within the spirit of our invention the ratchet 25 and pawl 26 may be eliminated, and the shaft of the ratchet connected directly or through suitable speed reduction means to a source of power, which may be the motor of the machine referred to or a separate source of power. This may be done through a flexible shaft. Thus, the electrode or welding member may be kept in continual motion rather than intermittent motion if desired.

At 14a we have also shown in simple form a wiper consisting of an arm fastened to a convenient point on the machine and carrying a wiping substance, such as felt, which bears against the electrode. The wiping action comes about through the rotation or other movement of the electrode; and this action tends to keep the electrode surface clean, permitting its re-use in cases where it is not too badly eroded. The application of similar wiping devices to the electrodes or tools of the other embodiments herein described will now be evident.

It is also to be noted that superior results are secured in welding when the face of the tool moving against the work is aslant to the line of movement, as is characteristic of all embodiments herein described.

In Figures 3 and 4 we have shown a type of mechanism suitable for using an elongated or pencil-like, cylindrical electrode. In this mechanism a sliding plate 30 is mounted upon suitable rails or rods 31, so as to be movable in the direction of motion of the conveyor. The main cam shaft of the machine is indicated at 32. This shaft bears a cam 33. A lever 34, controlled by a spring 35, is pivoted as at 36. At one end the lever 34 bears a cam follower 37 which may be in the form of a roller abutting the cam 33. At its other end, the lever is bifurcated as shown, and engages a stud 38 on the sliding plate 30. As the cam shaft revolves in timed sequence with the conveyor drive, the plate 30 will be caused to move from right to left in Figure 3. The electrode mechanism is mounted on this plate, and therefore traverses the work during that period in which the work is at rest.

In this case the electrode is a carbon pencil 39, held in a chuck 40 on a threaded shaft 41. The threaded shaft is mounted in threaded brackets 42 which are fixed upon but insulated from the sliding plate 30. Electrical connection may be made as at 43 to one or both of the brackets.

The cam shaft 32 carries a worm 44 which meshes with a worm wheel 45 or a reduction gear box 46. The driven shaft of the gear box is connected by a flexible shaft 47 to the threaded shaft through an insulative coupling 48. As the cam shaft 32 revolves the gear box transmits a very small fraction of this motion to the flexible shaft 47 and through it to the threaded shaft 41. Therefore, the carbon pencil 39 not only is slightly rotated during each operation, but also through the action of the threads on the shaft 41 is moved longitudinally. This combined motion presents fresh surfaces of the sealing electrode to the work and these surfaces trace a helical line on the carbon pencil 39. The carbon pencil, of course, traverses the work by reason of the movement of the sliding plate 30 as controlled by the cam 33 through the lever 34.

In Figures 5 to 11, inclusive, we have illustrated certain parts of an apparatus in which we employ a pencil type electrode which, however, is polygonal in cross section. The movement of this electrode again is both rotary and longitudinal, but differences in this mode of motion over that described in connection with Figures 3 and 4 are to be noticed. First the rotary movement is controlled so that an edge portion of the electrode is always presented to the work; and second, the electrode is not moved after or during each welding operation but is moved after a predetermined series of welding operations.

A sliding plate 49 is mounted upon suitable rods or rails 50 on the machine frame 1 for longitudinal movement in the direction of motion of the conveyor. This plate is moved by the cam 33 on the cam shaft 32 through a lever 34 in a manner similar to that described in connection with Figures 3 and 4. In Figure 7 means for clamping the tube ends and a housing are shown, which, though slightly different in shape are substantially similar to those heretofore described in connection with Figures 1 and 2, and do not require special description. The sliding plate may, if desired, be controlled by a spring 51.

The carbon pencil 52 which in this instance may be a hexagonal rod as shown, though other shapes will serve, is held in a chuck 53 on a shaft 54, journaled in supports 55, 56 and 57 on the sliding plate 49. A portion of this shaft is threaded as at 58 for giving to the electrode a longitudinal movement in connection with its rotation. A pair of half nuts 59 and 60 are carried upon arms 61 and 62 pivoted upon the support bracket 55. A tension spring 63 serves to hold these arms with the half nuts in contact with the threaded portion 58 of the shaft 54. Operating fingers 64 and 65 on these arms extend through a perforation in the main housing 1. The operator can, therefore, release the shaft from the half nuts and push it inwardly at the start of a cycle. The chucks 53 of Fig. 7 and 40 of Fig. 3, of course, make for the ready replacement of the electrodes.

The bracket members 56 and 57 also support and journal a shaft 66. At one end this shaft bears fixedly a pair of ratchet wheels 67 and 68. The ratchet wheel 68 has, however, a portion of its teeth cut away as at 69. A clock spring 70 is fastened to the ratchet wheel 68 as at 71, and is also fastened to the bracket 56 as at 72. A pawl 73 is pivoted on a bracket 74 on the frame of the machine. This pawl 73 may engage either or both of the ratchet wheels 68 and 67. At each traverse of the plate 49 the pawl 73 acts to turn these wheels in a clockwise direction. A pawl 75 pivoted on a suitable bracket 76 and controlled by a spring 77 engages the teeth only of the ratchet wheel 68. At the start of operations the relationship of parts is that illustrated in Fig. 9. At each traverse of the plate 49 the ratchet 73 rotates the ratchet wheels 67 and 68 clockwise and the pawl 75 holds them from reverse rotation. This action continues until the relationship of parts is that shown in Fig. 10. Here the pawl 75 is engaging the last tooth before the cut-out 69 in the ratchet wheel 68; and the ratchet wheels 67 and 68 have been rotated through nearly a complete revolution. On the next operation the pawl 75 passes beyond the last tooth and instead of engaging another tooth, comes into the cut-out 69 and is unable longer to hold the wheel 68. The pawl 75 thereupon tilts in the opposite direction as shown in Fig. 11, and the spring 70 which has been wound up in the meantime, rapidly drives the ratchet wheels in a counter clockwise direction back to starting position. The mechanism thus far described, therefore, is one in which a wheel is slowly rotated in the clockwise direction for practically a revolution and then automatically and rapidly returns to starting position.

On the other end of the shaft 66 we mount a pinion 78 which, of course, partakes of the movement aforesaid. This pinion meshes with a gear segment 79 rotatably mounted upon a sleeve 80 which is splined to the end of the shaft 54. We fasten to the sleeve 80 a ratchet wheel 81 which has interspaced teeth to the number of the sides of the polygonal welding electrode 52. A pawl 82 controlled by a spring 83 and fastened to the gear segment 79 engages the teeth of the ratchet wheel 81.

On the frame of the machine we mount a bracket 84 in which another pawl member 85 is slidably mounted and is controlled by a spring 86. The purpose of the pawl 85 is to hold the ratchet wheel 81 from rotation in a counterclockwise direction while the pawl 82 is slipping over its surface.

In operation, while the ratchet wheels 67 and 68 are turning in a clockwise direction in Fig. 5, the pinion 78 rotates the gear segment 79 in a counterclockwise direction. The pawl 82 slips over the surface of the ratchet wheel 81 while this wheel is being held by the pawl 85. The parts are so proportioned that by the time the controlling pawl 75 for the ratchet wheel 68 encounters the cut-away portion 69 of that ratchet wheel, the pawl 82 will have engaged the next tooth on the ratchet wheel 81. When, therefore, the ratchet wheels 67 and 68 fly back in a counterclockwise direction to their starting point, the consequent rotation of the segment 79 through the pawl 82 will drive the ratchet wheel 81 in a clockwise direction in Fig. 5 the distance of the interspacing of the teeth thereon. It does this in spite of the resistance of the pawl 85,—the pawls 82 and 85 and the teeth on the ratchet wheel 81 being so shaped as to permit this. The action just described results both in the rotation of the carbon pencil 52 through a sufficient arc to bring its next edge in contact with the work, and also in the advancement of the carbon pencil 52 through the action of the half nuts 59 and 60 on the threaded portion 58 of the shaft 54.

Thus in the mechanism illustrated in Figs. 5 to 11 inclusive, the operation is this: An edge of the carbon pencil 52 is presented to the work at the start; the carriage plate 49 is moved in timed sequence with the conveyor and a number of welding operations are carried on, using the same edge and the same point on the edge of the carbon pencil 52, and without change in its position. The number of welding operations thus carried on will be determined by the number of free teeth on the ratchet wheel 68. During this series of welding operations, however, energy is being stored up in the spring 70 by rotation of the ratchet wheels 67 and 68. When the pawl 75 engages in the cut-out portion 69 of the ratchet wheel 68, the mechanism flies back to starting position as heretofore explained. This results in presenting a new edge of the carbon pencil 52 to the work, and also results in the advancement of the carbon pencil slightly axially. By the mechanism described a very large number of welding operations can be carried on with a single electrode before it is necessary to replace this electrode with a new one.

To prevent overrunning of the wheels 67 and 68, they may be provided with a stud 87 which engages an arm 88 on the bracket 74. The engagement of this stud with the arm will limit the counterclockwise return of the ratchet wheels 67 and 68 under the influence of the spring 70.

Modifications may be made in our invention without departing from the spirit of it.

Having thus described our invention, what we claim as new and desire to secure by Letters Patent is:

1. In a welding apparatus for collapsible tubes, a welding means, means for causing said welding means to traverse juxtaposed ends of tubes during welding operations, and means for moving said welding means for changing its position so as to present fresh surfaces thereof to successive work being welded.

2. In a welding apparatus for collapsible tubes, an electrode, means for causing said electrode to traverse juxtaposed ends of tubes during welding operations, means for making electrical contact to said tubes and to said electrode, and means operating in connection with the means for moving said electrode for changing the position of said electrode so as to present fresh electrode surfaces to successive work being welded.

3. In a welding apparatus for collapsible tubes, a welding means, means for causing said welding means to traverse said tube ends during a welding operation, and means operating in connection with said traverse means for changing the position of said welding means so as to present fresh surfaces thereof to successive work being welded, said welding means being of circular form and said last mentioned means comprising means for rotating said welding means.

4. In a welding apparatus for collapsible tubes, a welding means, means for causing said welding means to traverse said tube ends during a welding operation, and means operating in connection with said traverse means for changing the position of said welding means so as to present fresh surfaces thereof to successive work being welded, said welding means being of circular form and said last mentioned means comprising means for rotating said welding means, and including a ratchet wheel mounted in connection with said welding means and a fixed pawl whereby said pawl will cause said ratchet wheel to turn, and an operative connection between said ratchet wheel and said welding means.

5. In a welding apparatus for collapsible tubes, a welding means, means for causing said welding means to traverse said tube ends during welding operations, and means operating in connection with said traverse means for changing the position of said welding means so as to present fresh surfaces thereof to successive work being welded, said welding means being of circular form and said last mentioned means comprising means for rotating said welding means, comprising a shaft on which said welding means is fastened, a worm wheel on said shaft, a worm engaging said worm wheel, a ratchet wheel connected with said worm, and a pawl positioned so as to move said ratchet wheel upon movement of said welding means in one direction.

6. In a welding apparatus for collapsible tubes, means for clamping tube ends, an electrode, means for causing said electrode to traverse said tube ends during a welding operation, means for making electrical contact to said tube ends and to said electrode, and means operating in connection with the means for moving said electrode for changing the position of said electrode so as to present fresh electrode surfaces to successive work being welded, said electrode being of elongated shape, a shaft for supporting said electrode, said shaft being threaded, a threaded mounting for said shaft, and means operable upon movement of said electrode for rotating said shaft.

7. In a device of the character described, means for clamping the juxtaposed walls of a collapsible tube, means for making electrical contact therewith, an elongated electrode, means for causing said electrode to traverse the ends of said tube and means operable upon movement of said electrode for rotating said electrode.

8. In a device of the character described, means for clamping the juxtaposed walls of a collapsible tube, an elongated welding means, means for causing said welding means to traverse the ends of said tube, and means in connection with said traverse means for rotating said welding means, said means comprising a threaded shaft bearing said welding means, a threaded mounting for said shaft on said moving means and a drive for said shaft connected with the drive for said moving means.

9. In a device of the character described, means for clamping the juxtaposed walls of a collapsible tube, means for making electrical contact therewith, an elongated electrode, means for causing said electrode to traverse the ends of said tube and means operable upon the movement of said electrode for rotating said electrode, said means comprising a threaded shaft bearing said electrode, a threaded mounting for said shaft on said moving means and a drive for said shaft connected with the drive for said moving means, said drive comprising a gear box connected with said moving means and a flexible shaft connecting said gear box with said first mentioned shaft.

10. In a device of the character described, an elongated welding means, means for causing said welding means to traverse the ends of said tube, and means in connection with said traverse means for rotating said welding means, said means comprising a threaded shaft bearing said welding means, a threaded mounting for said shaft on said traverse means and a drive for said shaft connected with the drive for said traverse means, said rotating means comprising means for storing energy during a predetermined number of welding operations and means for releasing said energy to move said welding means to a new position at the end of said series of welding operations.

11. In a device for sealing the ends of collapsible tubes by welding, an elongated polygonal welding means, means for causing said welding means to traverse the ends of tubes, and means for rotating said welding means to present fresh edges thereof to the work to be welded.

12. In a device of the character described, means for clamping the juxtaposed ends of a collapsible tube, means for making electrical contact therewith, an elongated polygonal electrode, means for making contact therewith, and means for moving said electrode, whereby to present fresh edges of said polygonal electrode to the work to be welded.

13. In a device of the character described, means for presenting the juxtaposed ends of a collapsible tube to be welded, an elongated polygonal welding means, and means for moving said welding means whereby to present fresh edges thereof to the work to be welded, said means comprising means for rotating said welding means through an arc equal to that subtended by each side of the polygonal cross section thereof.

14. In a device of the character described, means for presenting the juxtaposed ends of a collapsible tube for welding, an elongated polygonal welding means, and means for moving said welding means whereby to present fresh edges thereof to the work to be welded, said means comprising means for rotating said welding means through an arc equal to that subtended by each side of the polygonal cross section thereof, and concurrently acting means for moving said welding means axially.

15. In a device of the character described, means for presenting the juxtaposed ends of a collapsible tube for welding, an elongated polygonal welding means, and means for moving said welding means whereby to present fresh edges thereof to the work to be welded, said means comprising means for rotating said welding means through an arc equal to that subtended by each side of the polygonal cross section there, and concurrently acting means for moving said welding means axially, said last mentioned means comprising threaded means of stationary character engaging a threaded portion of the mounting means for said welding means whereby upon rotation of said mounting means axial movement will be imparted thereto.

16. In a device of the character described, means for presenting the juxtaposed ends of a collapsible tube, for welding, an elongated polygonal welding means, and means for moving said welding means whereby to present fresh edges thereof to the work to be welded, said means comprising means for rotating said welding through an arc equal to that subtended by each side of the polygonal cross section thereof, and concurrently acting means for moving said welding means axially, said last mentioned means comprising threaded means of stationary character engaging a threaded portion of the means for mounting said welding means whereby upon rotation of said mounting means axial movement will be imparted thereto, said means for rotating said welding means comprising means for storing up energy during a predetermined number of welding operations and at the end of said welding operations releasing said energy to rotate said mounting means

PAUL R. FECHHEIMER.
MERVIL HALLEAD.